US011360186B2

(12) United States Patent
Colafrancesco et al.

(10) Patent No.: US 11,360,186 B2
(45) Date of Patent: *Jun. 14, 2022

(54) POLARIZATION AXIS ATTENUATION AND CROSS POLARIZATION RESISTANT ANTENNA ORIENTATION ASSEMBLY FOR TRACKED OBJECT

(71) Applicant: 7hugs Labs SAS, Montrouge (FR)

(72) Inventors: Julien Colafrancesco, Paris (FR); Oliver Mandine, Le Plessis-Robinsson (FR)

(73) Assignee: 7HUGS LABS SAS, Montrouge (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/125,215

(22) Filed: Dec. 17, 2020

(65) Prior Publication Data

US 2021/0103024 A1 Apr. 8, 2021

Related U.S. Application Data

(63) Continuation of application No. 16/056,888, filed on Aug. 7, 2018, now Pat. No. 10,871,550.

(51) Int. Cl.
*G01S 7/02* (2006.01)
*G01S 13/72* (2006.01)
*G01S 13/74* (2006.01)

(52) U.S. Cl.
CPC ............. *G01S 7/025* (2013.01); *G01S 13/72* (2013.01); *G01S 13/74* (2013.01)

(58) Field of Classification Search
CPC .......... G01S 7/025; G01S 13/74; G01S 13/72; G01S 1/08; G01S 5/02; G01S 1/042; G01S 1/0428; H04W 64/00
See application file for complete search history.

(56) References Cited

U.S. PATENT DOCUMENTS 10,468,781 B1 * 11/2019 Paulsen ................... H01Q 3/46
10,871,550 B2    12/2020 Colafrancesco et al.
(Continued)

FOREIGN PATENT DOCUMENTS

EP      3383071 A4   10/2018
WO   2010122370 A1   10/2010
WO   2017113054 A1    7/2017

OTHER PUBLICATIONS

International Preliminary Report on Patentability dated Feb. 18, 2021 from International Application No. PCT/IB2019/056494, 8 pages.
(Continued)

*Primary Examiner* — Mamadou L Diallo
(74) *Attorney, Agent, or Firm* — Withrow & Terranova, P.L.L.C.; Vincent K. Gustafson

(57) ABSTRACT

Methods and systems related to an antenna orientation are disclosed herein. In one specific embodiment, a system comprises a positioning device configured to generate a positioning signal, a control object, and an object antenna configured to receive the positioning signal. The object antenna has a first polarization axis and is located on the control object. The system also comprises a positioning device antenna configured to transmit the positioning signal. The positioning device antenna has a second polarization axis and is located on the positioning device. The first polarization axis and the second polarization axis are offset from parallel by greater than thirty degrees when the positioning device and control object are in a standard operating mode. The first polarization axis and the second polarization axis are offset from perpendicular by greater than thirty degrees when the positioning device and control object are in a standard operating mode.

23 Claims, 4 Drawing Sheets

(56) References Cited

U.S. PATENT DOCUMENTS

| | | | |
|---|---|---|---|
| 2006/0019679 A1 | 1/2006 | Rappaport et al. | |
| 2013/0279631 A1* | 10/2013 | Bowers | H01Q 9/0407 375/300 |
| 2015/0381265 A1* | 12/2015 | Runyon | H01Q 1/288 455/13.3 |
| 2016/0036136 A1* | 2/2016 | Lin | H04B 7/00 455/73 |
| 2016/0097656 A1* | 4/2016 | Arumugam | G01S 1/08 324/207.17 |
| 2018/0288569 A1* | 10/2018 | Wang | H04W 4/025 |
| 2019/0190133 A1* | 6/2019 | Izadian | H01Q 1/3233 |
| 2020/0025944 A1* | 1/2020 | Mellier | G01S 19/43 |

OTHER PUBLICATIONS

International Search Report and Written Opinion dated Dec. 12, 2019 from International Application No. PCT/IB2019/056494 filed Jul. 30, 2019, 11 pages.

Nonfinal Office Action dated Apr. 15, 2020 from U.S. Appl. No. 16/056,888, 24 pages.

Notice of Allowance dated Aug. 12, 2020 from U.S. Appl. No. 16/056,888, 13 pages.

* cited by examiner

POLARIZATION AXIS ATTENUATION AND CROSS POLARIZATION RESISTANT ANTENNA ORIENTATION ASSEMBLY FOR TRACKED OBJECT

CROSS REFERENCE TO RELATED APPLICATIONS

This application is a continuation of U.S. patent application Ser. No. 16/056,888, filed Aug. 7, 2018 and subsequently issued as U.S. Pat. No. 10,871,550, which is wherein the entire contents of the foregoing application and patent are hereby incorporated by reference herein for all purposes.

BACKGROUND

Tracking an object in physical space can involve the transmission of electromagnetic signals and conducting analysis on those signals to determine the physical position of the object. The analysis can involve Time of Arrival (TOA), Angle of Arrival (AOA), and/or Received Signal Strength Indication (RSSI) metrics. The signals can be referred to as positioning signals because they are used to determine the position of the object. The signals can be generated by positioning devices. The analysis can involve the reception of many of such signals such as in a multilateration (MLAT) analysis. Tracking systems can be assisted by a reflective tag or antenna located on the object that interacts with the positioning signals. The positioning signals can be transmitted and received by antennas on the positioning devices. In certain approaches, an antenna on the object is also used to transmit outbound positioning signals which are generated on the object itself rather than the positioning devices.

SUMMARY

Methods and systems related to an antenna orientation are disclosed herein. In one specific embodiment, a system comprises a positioning device configured to generate a positioning signal, a control object, and an object antenna configured to receive the positioning signal. The object antenna has a first polarization axis and is located on the control object. The system also comprises a positioning device antenna configured to transmit the positioning signal. The positioning device antenna has a second polarization axis and is located on the positioning device. The first polarization axis and the second polarization axis are offset from parallel by greater than thirty degrees when the positioning device and control object are in a standard operating mode. The first polarization axis and the second polarization axis are offset from perpendicular by greater than thirty degrees when the positioning device and control object are in a standard operating mode.

DETAILED DESCRIPTION

Figure 1:
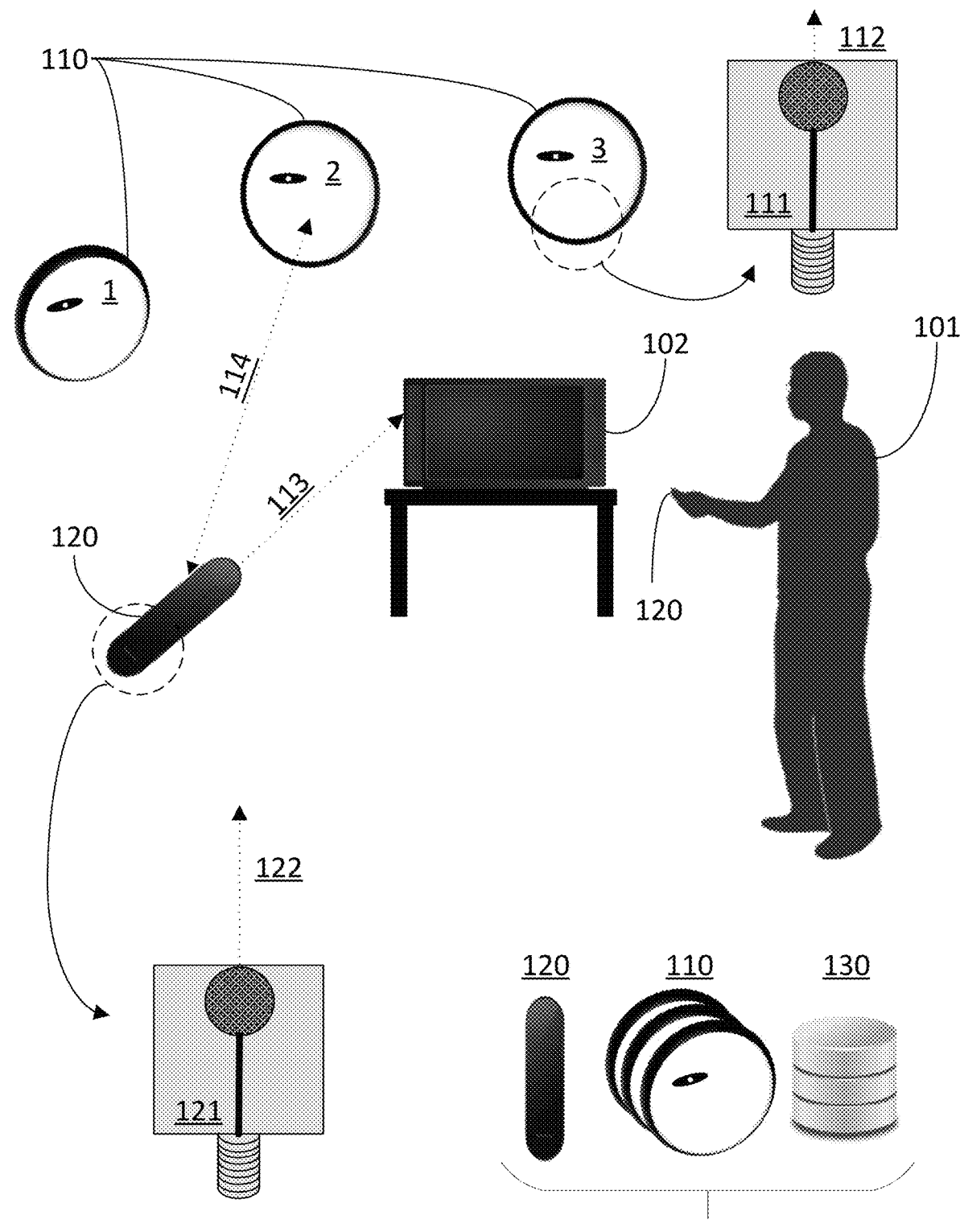
FIG. 1 illustrates a system for tracking the position of a pointing object using a set of positioning devices that transmit and receive signals to and from an antenna located on the pointing object in accordance with specific embodiments of the present invention.

Systems and methods used for improving the performance of an antenna in a positioning system are disclosed in detail herein below. The systems can involve antenna assemblies for properly fixing the antenna relative to the position of the device to which it is attached. The methods can involve tilting the antenna relative to a main axis of the device. The antennas can be located in a positioning device in the positioning system or in the tracked object. The main axis of the device can be defined relative to the orientation that the device will generally be placed in during its standard operating mode. For example, the main axis of a remote control is defined by the pointing axis of the remote control. As another example, the main axis of a wall-mounted positioning device is defined by a vector extending from the center of the device upwards towards the ceiling and parallel to the wall. The antenna can be positioned to optimize the performance of a tracking system used to track the object. Specifically, the angle at which the antenna is tilted by an antenna assembly can be selected to optimize the performance of a tracking system used to track the object. Specific embodiments and variations of these concepts are disclosed below with reference to FIGS. 1-4. The specific embodiments of these concepts as disclosed in this section are provided for explanatory purposes and are not meant to limit the invention, the scope of which is provided by the appended claims.

Specific embodiments of the invention relate to the positioning of an antenna in a positioning device or an object to be tracked by a positioning system relative to the body of the device itself. Specific embodiments of the invention relate to the relative positioning of an antenna in a positioning device and an antenna in an object to be tracked by a positioning system. A positioning system 100 is provided with reference to FIG. 1. Positioning system 100 includes a set of positioning devices 110, an object to be tracked 120, and an optional server 130. The object to be tracked can be a mobile device. The set of positioning devices can transmit and receive positioning signals 114 that are reflected off, or transmitted by, object 120. While positioning signals are exchanged between the object and the positioning devices, the analysis of the signals conducted to determine a position of the object can be conducted on the object, by the set of positioning devices, on the server, or any combination thereof.

The object being tracked can be any object whose position needs to be determined by an automated system. The object can be a control object such as a device for generating control signals. The object can be a pointing object such as a remote control, presentation pointer, inventory management device, or a toy used for wireless tag. The pointing object will have a defined pointing direction which is associated with a pointing axis the user aligns a target with when pointing. The pointing object could be configured to transmit signals along the pointing axis in order to fulfill its main functionality. In the illustrated situation, the pointing object is a remote control, the target is a television, and the signal includes a power-on command for the television. In other embodiments, the object can be a drone, smart phone, tablet computer, wearable computing device, or any other computing device.

In the specific example of FIG. 1, object 120 is a dedicated device that operates as a remote control and the pointing axis 113 is the pointing direction of the remote control. The remote can operate to control one or more electronic devices and may transmit signals to these devices using any form of wireless transmitter. The tracking system can be used to determine which device the controller is pointing towards at any given time. Specifically, the positioning system can be used to determine the direction of the pointing axis in a reference frame used to identify what the target of the pointing object might be. In the illustrated case, user 101 can align pointing axis 113 with target 102 to provide a command to the television. As will be described below, the same antenna could be used to send the command, or other signal transmitted by the pointing object, and interact with the positioning signals from the positioning devices 110.

A set of external positioning devices for tracking the position of an object in accordance with this disclosure can take on various forms. The set of external positioning devices can include two or more substantially homogenous elements that measure the position of the object in physical space. The set of external positioning devices can measure the position of the object using wireless signals. For example, the external positioning devices can direct wireless signals towards a tag or transceiver on the object and conduct a TOF analysis on those signals and obtain a measurement of the object's position using MLAT. The external positioning device can include a separate wireless transmitter for communicating encoded information with the other external positioning devices and the object such as via a Wi-Fi, Z-wave, or Zigbee protocol.

In the specific system illustration of FIG. 1, the set of external positioning devices 110 are a set of wall-mounted anchors located in a room with object 120. Object 120 can also include a distance sensor and local positioning system (LPS) receiver for communicating with the set of external positioning devices 110 and determining the position of object 120. In the illustrated case, the external positioning devices transmit wireless signals to an antenna 121 on the device and obtain a measurement of its position using TOF and MLAT. Antenna 121 can be an LPS receiver designed to interact with the set of external positioning devices 110. The set of external positioning devices 110 may be arranged in a space such that they are not co-linear. The set of external positioning devices 110 may function better if they have a line-of-sight to one another. Accordingly, the set of external positioning devices 110 can be mounted high (e.g. at least 2 meters above the floor). The external positioning devices can be mounted to different walls of the space. The LPS receiver may implement an ultra-wideband (UWB) local positioning system. The external positioning devices may communicate wirelessly with one another and with the object 120 to implement a UWB LPS system or any other LPS system known in the art. In particular, the positioning devices can include antennas such as antenna 111 to transmit and receive positioning signals. The set of antennas and set of positioning devices can have a one-to-one correspondence. An antenna 121, located on the object, can be referred to as an object antenna. An antenna 111, located on a positioning device, can be referred to as a positioning device antenna to distinguish the two antennas. In embodiments where the object is a pointing object, the antenna can be referred to as a pointing object antenna.

The object and positioning antennas can take on various forms. As illustrated, object antenna 121 and positioning device antenna 111 are UWB omnidirectional and linear polarization (OLP) antennas. In a linearly polarized antenna, the polarization axis is generally the antenna's axis of greatest length. In FIG. 1, object antenna 121 has a first polarization axis 122 and positioning device antenna 111 has a second polarization axis 112. The antennas can be fixed on the positioning device and object with a relative offset of these first and second axes to improve the performance of the positioning system as will be described below. The relative offset can be measured when each of the devices are positioned in their standard operating position. While the antennas of the other positioning devices besides 3 are not shown, each of the devices can have an antenna that is fixed in the same manner relative to the body of the positioning device and each antenna can share the polarization axis 112. Although FIG. 1 illustrates each antenna as being an omnidirectional patch antenna, the antennas can: be directional antennas; have patch, dual patch, dipole, monopole, slot, or split ring resonator antenna structures; and can have linear polarization, circulator polarization, or elliptical polarization.

Figure 2:
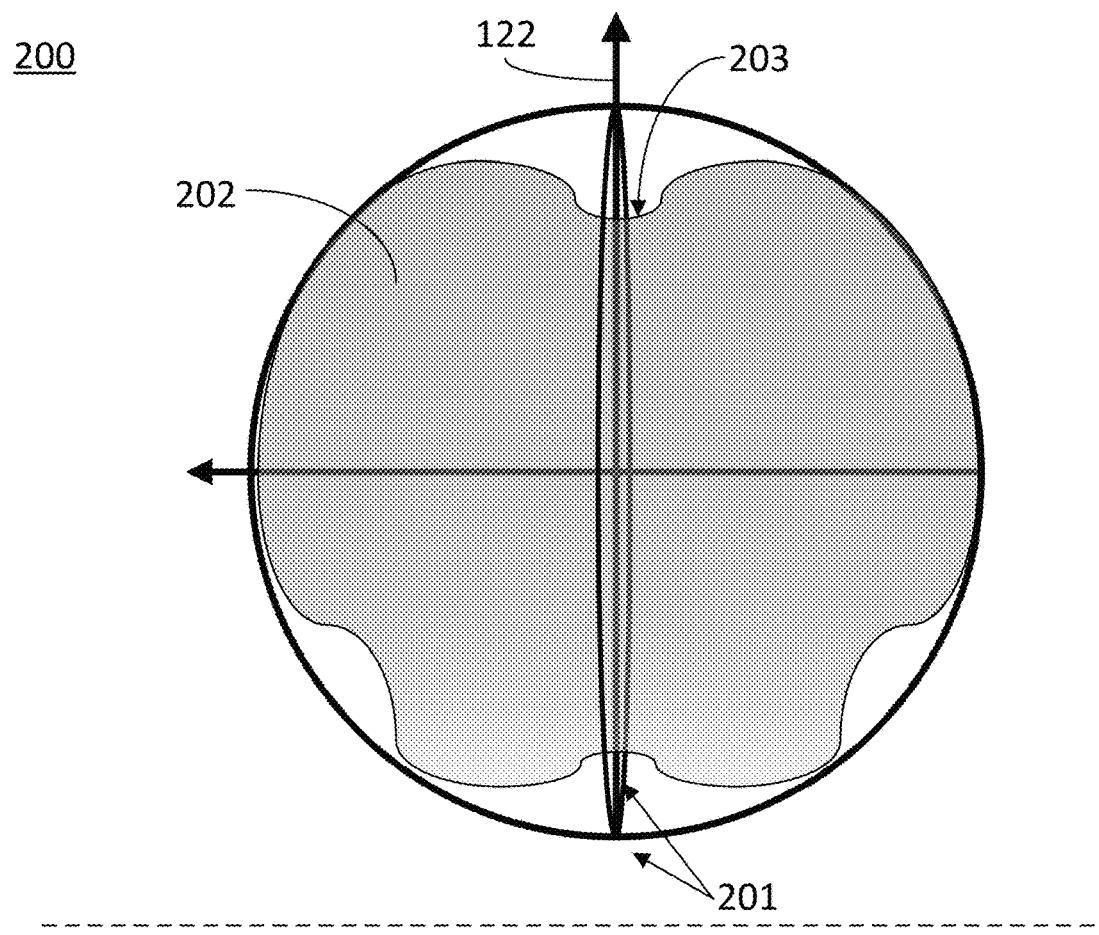
FIG. 2 illustrates an antenna radiation pattern showing polarization axis attenuation and an example of cross polarization in accordance with the related art.
Figure 2:
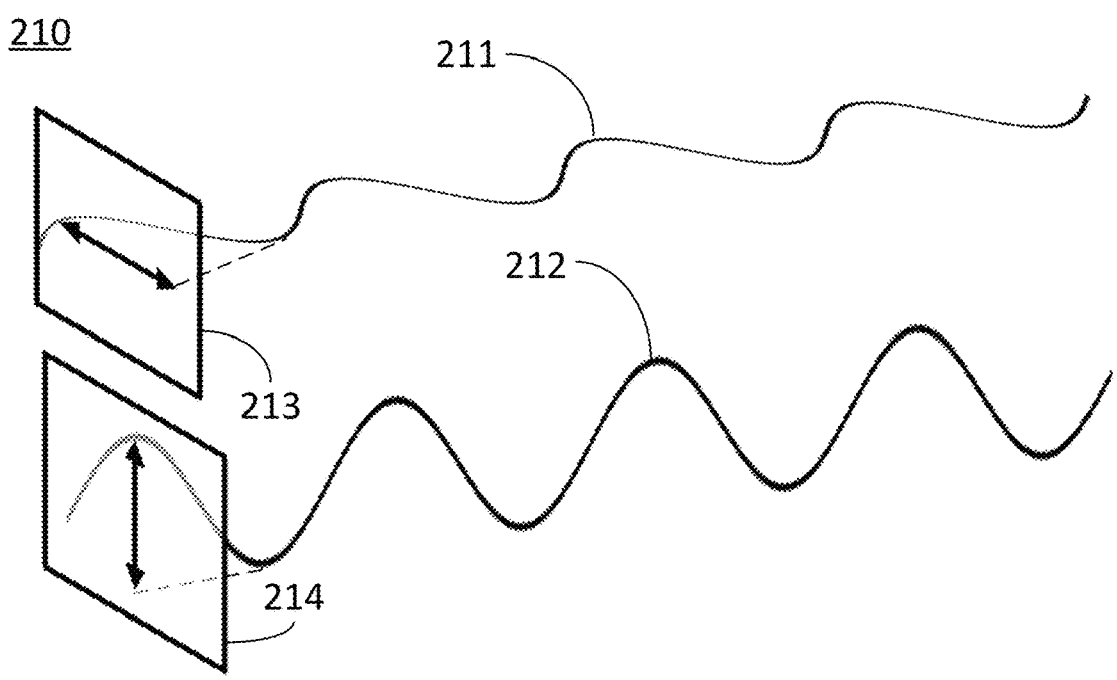

FIG. 2 includes two diagrams that illustrate relevant behaviors of wireless systems for purposes of explaining the benefits of some of the embodiments disclosed herein. The disclosure is in accordance with the related art. The wireless systems in accordance with FIG. 2 are both omnidirectional and linearly polarized. However, the disclosures herein are more broadly applicable and these examples are provided merely for illustrating benefits associated with a specific subset of the embodiments disclosed herein.

Diagram 200 shows a radiation pattern 202 of object 120 from FIG. 1. Radiation pattern 202 is drawn relative to an ideal omnidirectional radiation pattern in the form of a perfect sphere shown by two concentric circles 201 that have been rotated relative to each other around the polarization axis of the antenna 122. As seen, the radiation pattern includes an attenuation 203 along the polarization axis of the antenna 122. The radiation pattern 202 can be approximated by a torus, with the polarization axis as its center. This implies a strong attenuation of transmissions and receptions in the direction of polarization axis 122. Theoretically, reception and transmission are null on axis 122, although in real situations some signal reception and transmission still exist but are just significantly attenuated.

Diagram 210 illustrates two linearly polarized electromagnetic waves 211 and 212 where wave 211 has a horizontal polarization and wave 212 has a vertical polarization. Wave 211 is generated by a patch antenna with a horizontal polarization axis 213. Wave 212 is generated by a patch antenna with a vertical polarization axis 214. As the polarization of a signal is rotated from the polarization of wave 211 to the polarization of wave 212, patch antenna 213 will have an increasingly challenging time resolving the signal. The same is true for antenna 214 as the polarization of wave 212 is rotated towards that of wave 211. In the case of antenna 213 attempting to communicate with antenna 214 (i.e., two antennas communicating with orthogonal polarizations) communication is theoretically impossible. This phenomenon is called cross polarization.

In specific embodiments, the antenna on the positioning device and the antenna on the object being tracked can be oriented to maximize the efficacy of communication between the two devices. The positioning antenna polarization axis and the object antenna polarization axis can be offset from parallel by greater than thirty degrees, and offset from perpendicular by greater than thirty degrees. In more specific embodiments, the positioning antenna polarization axis and the object antenna polarization axis can be offset from each other by forty-five degrees. In the case of linearly polarized antennas, the benefit of such an approach is that the effects of on-axis attenuation and cross polarization are both minimized to an appreciable degree. The benefits of this approach have been observed to apply mainly within a fifteen degree plus or minus variation from a forty-five degree offset. The antennas can be fixed relative to the position of the positioning device and object to meet these conditions while the devices are placed in their standard operating positions. The antennas can be fixed in such manner by antenna assemblies that are encapsulated within the devices. The antenna assemblies can include a substrate, such as a printed circuit board, to which the antennas are connected. The antennas can be held at an angle off the substrate and the substrate can have a fixed configuration relative to the device by being permanently fixed to a frame or body of the device. The antennas can also be positioned at an angle off from a main axis of the device while being flush with the substrate. In other words, the antennas can either be tiled by being rotated in the plane of the substrate or by being rotated out of the plane of the substrate.

Figure 3:
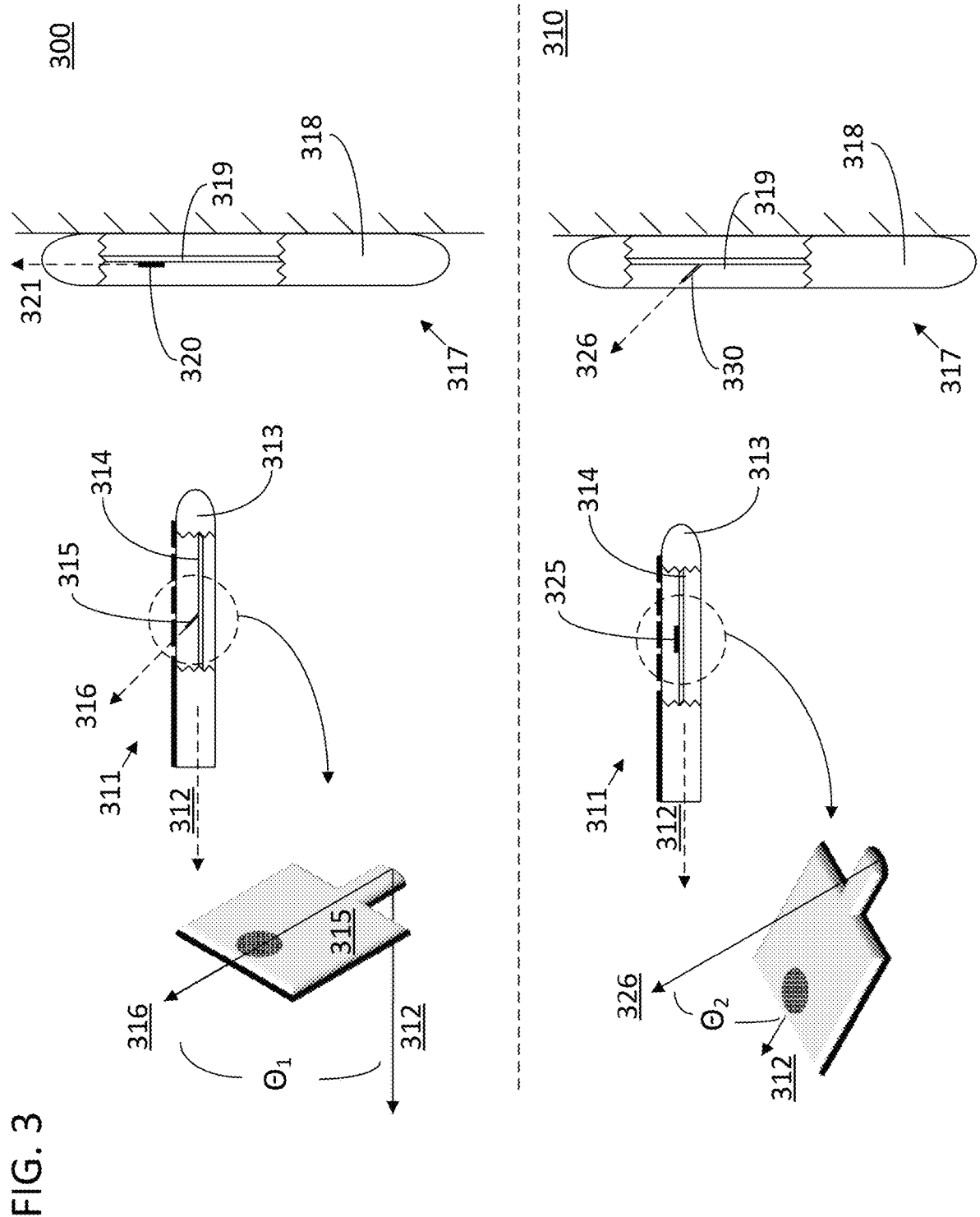
FIG. 3 illustrates two sets of a cross sections for a pointing object and a positioning device which reveal antenna assemblies located within the devices that are in accordance with specific embodiments of the present invention.

FIG. 3 can be used to describe a set of specific embodiments of the invention that are in accordance with the approach described in the previous paragraph. In diagram 300 an object 311 with a pointing axis 312 includes a body 313. Object 311 is a pointing object whose pointing axis is generally held horizontal during the standard operating mode of the devices. For example, object 311 could be a remote control. A portion of body 313 has been removed in the figure to illustrate a printed circuit board 314 on which an antenna 315 has been fixed. The printed circuit board 314 also includes a microprocessor. The microprocessor can be communicatively coupled to antenna 315 via the printed circuit board 314. The microprocessor can store instructions to generate or process positioning signals received by antenna 315. The microprocessor can also generate and transmit commands to devices that are identified by the user of the pointing object. As illustrated, the microprocessor, the antenna, and the antenna assembly are all encapsulated within the body of the device.

Diagram 300 also includes positioning device 317 which includes a body 318 that has been partially removed in the figure to reveal a printed circuit board 319. The printed circuit board 319 also includes a microprocessor. In the illustrated case, the positioning device antenna 320 is aligned flush with printed circuit board 319. Antennas 320 and 315 can both be OLP antennas such that the polarization axis 321 of antenna 320 is parallel with the surface of the wall to which positioning device 317 is mounted. The microprocessor can be communicatively connected to the positioning device antenna 320 via the printed circuit board 319. The microprocessor can store instructions to generate or process positioning signals received by antenna 320. As illustrated, the microprocessor, the antenna, and the antenna assembly are all encapsulated within the body of the device.

Both antennas 315 and 320 can be fixed in place by an antenna assembly. The antenna assembly can include a socket on a printed circuit board. For example, if the antennas were patch antennas with female coaxial sockets, the antenna assembly could include a male coaxial socket integrated with the printed circuit board. In the case of object 311, the antenna assembly can hold the antenna at an angle off the surface of the printed circuit board. The angle can be held by a socket formed on the printed circuit board and compatible with the antenna. For example, the socket can be an angled coaxial connection formed on the surface of the printed circuit board. The angle can be set to hold the polarization axis of the antenna at an orientation that is greater than thirty degrees from parallel with the pointing axis and less than sixty degrees from perpendicular with the pointing axis. In specific embodiments, the angle can be set to hold the polarization axis of the antenna at forty-five-degree angle offset from the pointing axis. In an alternative embodiment, the antenna can be kept flush with the substrate while having its polarization axis rotated out of alignment with pointing direction 312. The same angles applied for antenna 315 can be applied for such an approach.

Positioning the pointing objects antenna's polarization axis 316 at the angles described in the previous paragraph provides certain benefits because doing so indirectly assures that the polarization axis of the pointing object is set to a desired angle offset from the polarization axis of the positioning devices's antenna while each device is in its standard operating mode. The detailed view of antenna 315 in diagram 300 includes a labeled angle theta-sub-one defined by the offset of the pointing axis 312 from the polarization axis of the pointing object's antenna 316. As illustrated, the polarization axis 321 of antenna 320 can be parallel with the surface of the wall to which positioning device 317 is mounted. As such, perfect cross polarization between the two antennas would occur when theta-sub-one was set to zero or one-hundred-eighty. Likewise, perfect along polarization axis attenuation would occur when theta-sub-one was set to ninety or two-hundred-seventy. Minimizing both sources of attenuation can therefore be achieved by placing theta-sub-one somewhere on the order of thirty to sixty degrees, such as at forty-five degrees. Those of ordinary skill in the art will recognize that similar windows in the other three quadrants of the unit circle would provide similar benefits (i.e., those in which theta-sub-one was approximately one-hundred-thirty-five, two-hundred-twenty-five, and three-hundred-fifteen degrees). Pointing axis 312 therefore serves as a proxy for a perpendicular axis to the polarization axis of antenna 320 and configuring antenna 315 at an angle off the pointing direction indirectly assures a desired offset between the pointing object antenna and the positioning device antenna.

Diagram 310 is similar to diagram 300 except that the antenna 330 of positioning device 317 has been tilted out from being parallel with the wall and the antenna 325 of the pointing object 311 has been set to have a polarization axis equal to the pointing axis 312 of the pointing object. In specific embodiments in accordance with diagram 310, the antenna assembly is configured to assure that the polarization axis of the positioning device's antenna is greater than thirty degrees offset from being perpendicular to the wall and greater than thirty degrees offset from being parallel to the wall. Those of ordinary skill in the art will recognize that the tilting of antenna 330 is just one of many tilting directions that could achieve this result. In an alternative embodiment, the polarization axis of antenna 330 can be kept parallel with the wall, as in the case of diagram 300, while being rotated sideways along the wall in either a clockwise or counterclockwise direction. The same angle offsets applied for antenna 315 can be applied for such an approach, but with reference to the main axis of positioning device 317. In this example, the main axis of positioning device 317 points directly up from the center of the positioning device and parallel to the wall.

The remaining aspects of diagram 310 match those of diagram 300. In particular, both antenna 330 and 325 are LP antennas. As a result, the polarization axis of the pointing object antenna 325 is offset from the polarization axis 326 of the positioning device antenna 330 by an angle theta-sub-two. The angle can be set similarly to theta-sub-one. Specifically, the angle can be set to somewhere between thirty and sixty degrees, such as forty-five degrees. Those of ordinary skill in the art will recognize that similar windows in the other three quadrants of the unit circle would provide similar benefits (i.e., those in which theta-sub-two was approximately one-hundred-thirty-five, two-hundred-twenty-five, and three-hundred-fifteen degrees). In accordance with this configuration, the cross polarization and along-axis attenuation between the two antennas is minimized just as in the example of diagram 300. In accordance with either physical configuration of the devices in diagram 300 and 310, when the devices are in their standard operating configurations, the polarization axis of the pointing object and the polarization axis of the positioning devices are offset from parallel by greater than thirty degrees, and are offset from perpendicular by greater than thirty degrees.

The examples in FIG. 3 illustrate a single positioning device. However, positioning devices such as 317 can be individual positioning devices in a set of positioning devices. The multiple devices can be installed and be placed on different walls or on the same wall. The devices can be generally placed at the same height. In these embodiments, the polarization axes of the antennas in the various positioning devices can all be identical and recognize the benefits disclosed herein. However, the axes of each device can also be distributed to account for the fact that the tracked object will tend to be oriented with slight variations around its standard operating position. For example, in a positioning system with three or four positioning devices and a remote control having an antenna with a polarization axis that is aligned with its pointing direction, the polarization of the antennas can be distributed evenly from thirty degrees to sixty degrees offset from parallel with the surface of the wall.

Figure 4:
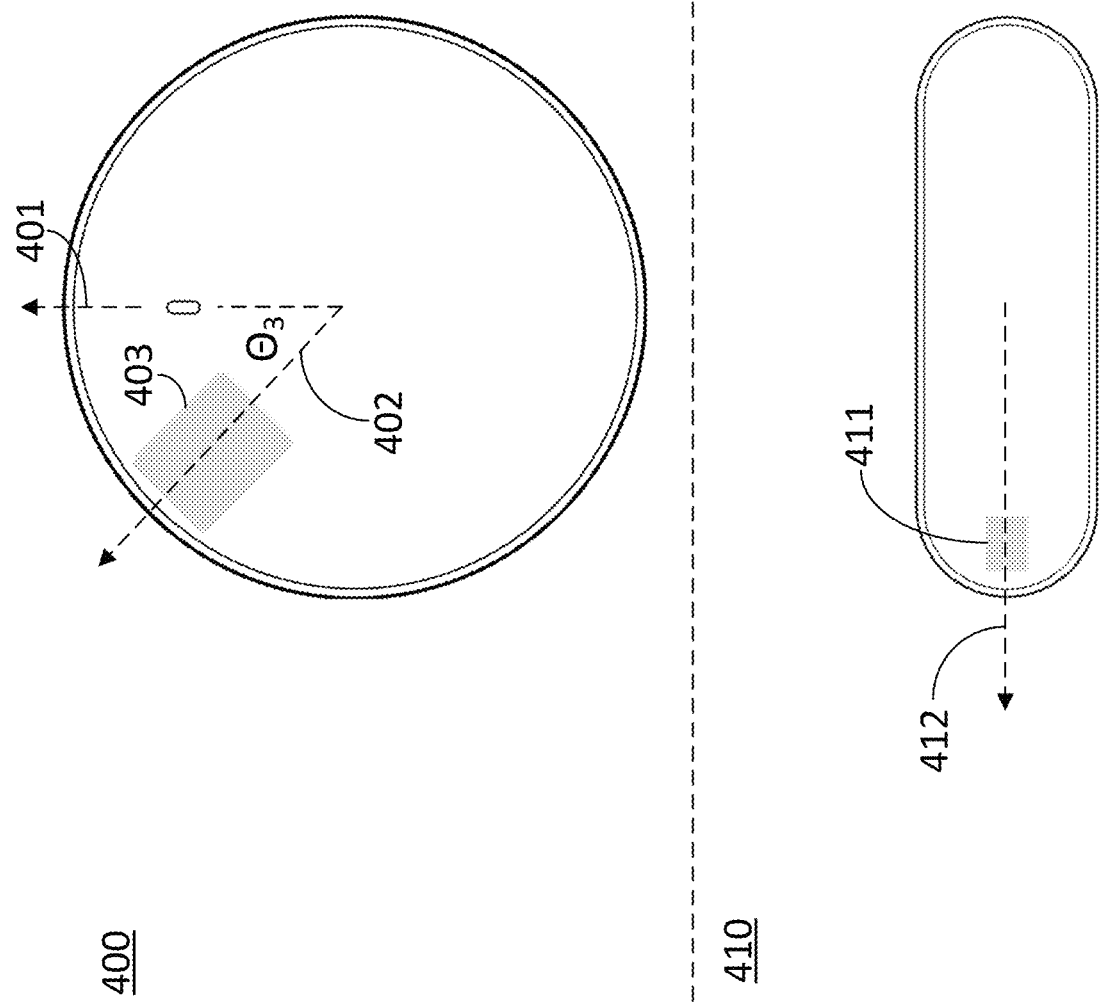
FIG. 4 illustrates a set of cross sections for a pointing object and a positioning device which reveal antenna assemblies located within the devices that are in accordance with specific embodiments of the present invention.

FIG. 4 provides an illustration of another potential configuration for the antenna on a pointing object and on a wall-mounted positioning device that are in accordance with specific embodiments of the disclosed invention. Wall-mounted positioning device 400 is shown with its main axis 401 pointing up towards the ceiling of the room and parallel with the wall to which device 400 is mounted. As illustrated, an LP patch antenna 403 has been positioned within device 400 such that its polarization axis 402 is at an angle theta-sub-three offset from the main axis 401. The view of positioning device 400 is a view looking directly at the wall as opposed to the side view of FIG. 3. At the same time, an LP patch antenna 411 on pointing device 410 has been positioned such that its polarization axis 412 is in line with the pointing direction of pointing object 410. The view of pointing object 410 in FIG. 4 is a top down view of the object as opposed to the side view of FIG. 3. The angle theta-sub-three offset can take on the same characteristics as the angle theta-sub-two and theta-sub-one mentioned above in order to provide those same benefits. Specifically, theta-sub-three can be beneficially placed from thirty to sixty degrees. In a specific embodiment, theta-sub-three can be forty-five degrees. Since, in the standard operating mode, pointing axis 412 will be perpendicular to main axis 401, if theta-sub-three is selected to be from thirty to sixty degrees, the angle between the polarization axes of the two devices will likewise be from sixty to thirty degrees respectively. As such, the combined system will recognize some of the benefits disclosed herein.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, the disclosure used the example of wall-mounted positioning devices and a pointing object that is most often positioned parallel with a floor to illustrate benefits of some of the disclosed embodiments. However, specific embodiments disclosed herein are more broadly applicable to any combination of positioning and pointing objects where the devices have a fixed orientation relative to each other in a standard operating mode. Furthermore, as many positioning devices include internal gyroscopes or other sensors used for determining an orientation of the positioning device, the orientation of the antenna can be a configurable property of the pointing object and the relative orientation of the positioning device antenna to the pointing object antenna can be controlled by a feedback loop which evaluates data from such sensors and adjusts the orientation of either antenna in response to that data. Such a feedback loop could be computer-controlled or wholly mechanical. The target of the feedback loop could be set to maintain the polarization axis of the device within a forty-five degree offset plus or minus fifteen degrees from the polarization axis of the counterpart device. Furthermore, though many examples in the disclosure were directed to positioning devices, the same approaches could be applied to any secondary device, or set of secondary devices that are meant to transmit signals to an antenna on a mobile object. The signals can include any type of command or data. The secondary devices could share any of the general characteristics mentioned above with respect to the positioning devices. For example, the secondary devices could be wall mounted and could have a one-to-one correspondence with a set of OLP antennas. The set of OLP antennas could be tilted as described above with reference to the antennas on the positioning devices. These and other modifications and variations to the present invention may be practiced by those skilled in the art, without departing from the scope of the present invention, which is more particularly set forth in the appended claims.

What is claimed is:

1. A system comprising:
 a positioning device having a main axis and configured to generate a positioning signal;
 a control object having a pointing axis;
 an object antenna configured to receive the positioning signal, having a first polarization axis, and located on the control object; and
 a positioning device antenna configured to transmit the positioning signal, having a second polarization axis, and located on the positioning device;
 wherein, when the control object is positioned so that the pointing axis of the control object is in a plane perpendicular to the main axis of the positioning device:
  (i) the first polarization axis and the second polarization axis are offset from parallel to each other by greater than thirty degrees; and
  (ii) the first polarization axis and the second polarization axis are offset from perpendicular to each other by greater than thirty degrees.

2. The system of claim 1, wherein:
 the positioning signal is an ultra-wide band positioning signal; and
 the object antenna and positioning device antenna are both omnidirectional and linear polarization antennas.

3. The system of claim 2, wherein:
the control object is a remote control; and
the object antenna is tilted on the control object to offset the pointing axis from the first polarization axis by greater than thirty degrees and less than sixty degrees.

4. The system of claim 1, further comprising:
a microprocessor on the positioning device storing instructions to generate the positioning signal; and
a printed circuit board on the positioning device;
wherein the microprocessor is located on the printed circuit board;
wherein the microprocessor is communicatively connected to the positioning device antenna via the printed circuit board; and
wherein the positioning device antenna is an omnidirectional and linear polarization antenna.

5. The system of claim 4, further comprising:
an antenna assembly that fixes the positioning device antenna at an angle offset relative to the printed circuit board;
wherein the angle is greater than thirty degrees and less than sixty degrees; and
wherein the positioning device antenna, the antenna assembly, and the printed circuit board are all encapsulated within the positioning device.

6. The system of claim 1, wherein:
the positioning device is mounted to a wall;
the main axis is parallel to the wall;
the second polarization axis is greater than thirty degrees offset from being perpendicular to the wall;
the second polarization axis is greater than thirty degrees offset from being parallel to the wall;
the control object is a remote control;
the pointing axis is a pointing direction of the remote control; and
the positioning signal is used to determine the pointing axis of the remote control.

7. The system of claim 1, further comprising:
a set of positioning devices that transmit a set of positioning signals to the control object and include the positioning device;
a set of positioning device antennas located on the set of positioning devices in a one-to-one correspondence with the set of positioning devices and that include the positioning device antenna; and
wherein the set of positioning device antennas share the second polarization axis.

8. The system of claim 1, wherein:
the first polarization axis and the second polarization axis are offset from each other by forty-five degrees.

9. The system of claim 1, wherein:
the control object is a pointing device; and
the pointing axis of the pointing device is aligned with the first polarization axis.

10. The system of claim 1, further comprising:
a set of wall-mounted secondary devices; and
a set of OLP secondary device antennas: (i) located on the set of wall-mounted secondary devices in a one-to-one correspondence; (ii) having a secondary device antenna polarization axis; and
(iii) tilted to set the secondary device antenna polarization axis greater than thirty and less than sixty degrees offset from horizontal;
wherein the positioning signal is in a set of positioning signals; and
wherein the set of OLP secondary device antennas transmit the set of positioning signals to the control object.

11. The system of claim 10, wherein:
the set of positioning signals is a set of ultra-wide band (UWB) positioning signals; and
the system is a UWB positioning system.

12. A method comprising:
generating, by a positioning device, a positioning signal;
transmitting, by a positioning device antenna located on the positioning device and having a first polarization axis, the positioning signal; and
receiving, by an object antenna located on a control object and having a second polarization axis, the positioning signal;
wherein:
the positioning device has a main axis;
the control object has a pointing axis; and
when the control object is positioned so that the pointing axis of the control object is in a plane perpendicular to the main axis of the positioning device:
(i) the first polarization axis and the second polarization axis are offset from parallel to each other by greater than thirty degrees; and
(ii) the first polarization axis and the second polarization axis are offset from perpendicular to each other by greater than thirty degrees.

13. The method of claim 12, wherein:
the positioning signal is an ultra-wide band positioning signal; and
the object antenna and positioning device antenna are both omnidirectional and linear polarization antennas.

14. The method of claim 13, wherein:
the control object is a remote control; and
the object antenna is tilted on the control object to offset the pointing axis from the first polarization axis by greater than thirty degrees and less than sixty degrees.

15. The method of claim 12, wherein:
the positioning device includes a microprocessor storing instructions to generate the positioning signal and a printed circuit board;
the microprocessor is located on the printed circuit board;
the microprocessor is communicatively connected to the positioning device antenna via the printed circuit board; and
the positioning device antenna is an omnidirectional and linear polarization antenna.

16. The method of claim 15, wherein:
an antenna assembly fixes the positioning device antenna at an angle offset relative to the printed circuit board;
the angle is greater than thirty degrees and less than sixty degrees; and
the positioning device antenna, the antenna assembly, and the printed circuit board are all encapsulated within the positioning device.

17. The method of claim 12, wherein:
the positioning device is mounted to a wall;
the main axis is parallel to the wall;
the second polarization axis is offset from being perpendicular to the wall by an angle greater than thirty degrees;
the second polarization axis is offset from being parallel to the wall by an angle greater than thirty degrees;
the control object is a remote control;
the pointing axis is a pointing direction of the remote control; and
the positioning signal is used to determine the pointing axis.

18. The method of claim 12, wherein:

the positioning device is included in a set of positioning devices that transmit a set of positioning signals to the control object;

the positioning device antenna is included in a set of positioning device antennas located on the set of positioning devices in a one-to-one correspondence with the set of positioning devices; and the set of positioning device antennas share the second polarization axis.

19. The method of claim 12, wherein:

the first polarization axis and the second polarization axis are offset from each other by forty-five degrees.

20. The method of claim 12, wherein:

the control object is a pointing device; and the pointing axis is aligned with the first polarization axis.

21. The method of claim 12, wherein:

the positioning signal is in a set of positioning signals;

the set of positioning signals is transmitted to the control object by a set of OLP secondary device antennas; and the set of OLP secondary device antennas: (i) is located on a set of wall-mounted secondary devices in a one-to-one correspondence; (ii) has a secondary device antenna polarization axis and (iii) is tilted to set the secondary device antenna polarization axis greater than thirty and less than sixty degrees offset from horizontal.

22. The method of claim 21, wherein:

the set of positioning signals is a set of ultra-wide band (UWB) positioning signals; and the method is utilized by a UWB positioning system.

23. A system comprising:

a positioning device having a main axis;

a control object having a pointing axis;

an object antenna having a first polarization axis, and located on the control object;

a positioning device antenna having a second polarization axis, and located on the positioning device; and one or more microprocessors storing instructions to:

generate, by the positioning device, a positioning signal;

transmit, using the positioning device antenna, the positioning signal; and receive, using the object antenna, the positioning signal;

wherein, when the control object is positioned so that the pointing axis of the control object is in a plane perpendicular to the main axis of the positioning device:

(i) the first polarization axis and the second polarization axis are offset from parallel to each other by greater than thirty degrees; and (ii) the first polarization axis and the second polarization axis are offset from perpendicular to each other by greater than thirty degrees.

* * * * *